April 9, 1929. K. J. TOBIN 1,708,525
CAR DOOR BRACKET AND GUIDE
Filed March 24, 1927 2 Sheets-Sheet 2
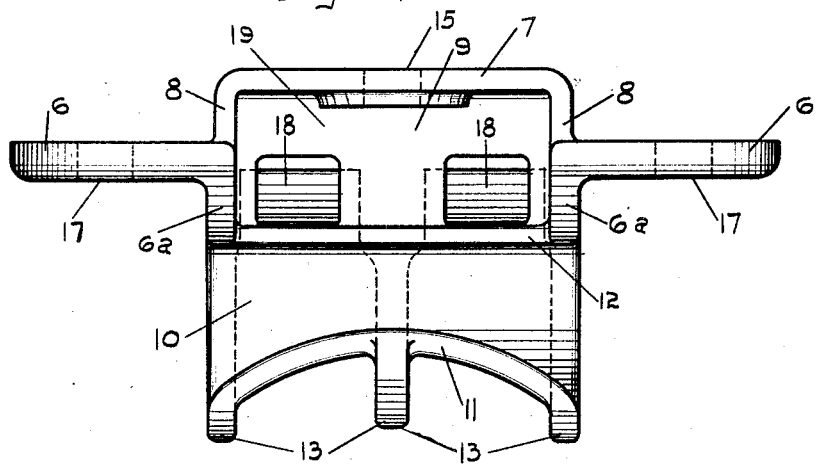
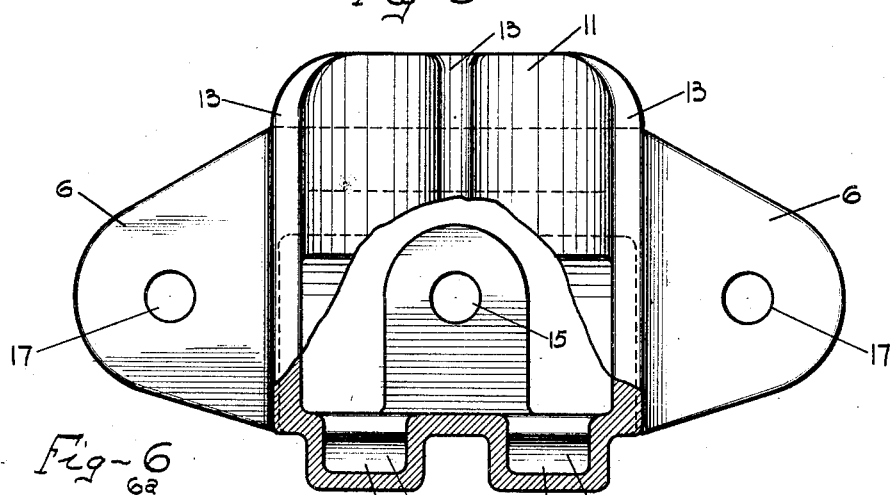
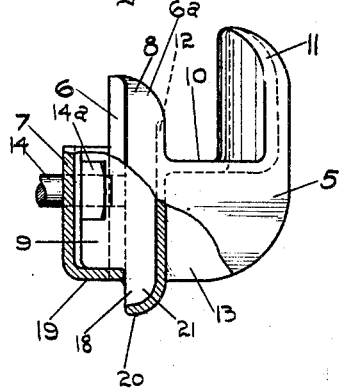
—INVENTOR—
Kenneth J. Tobin.

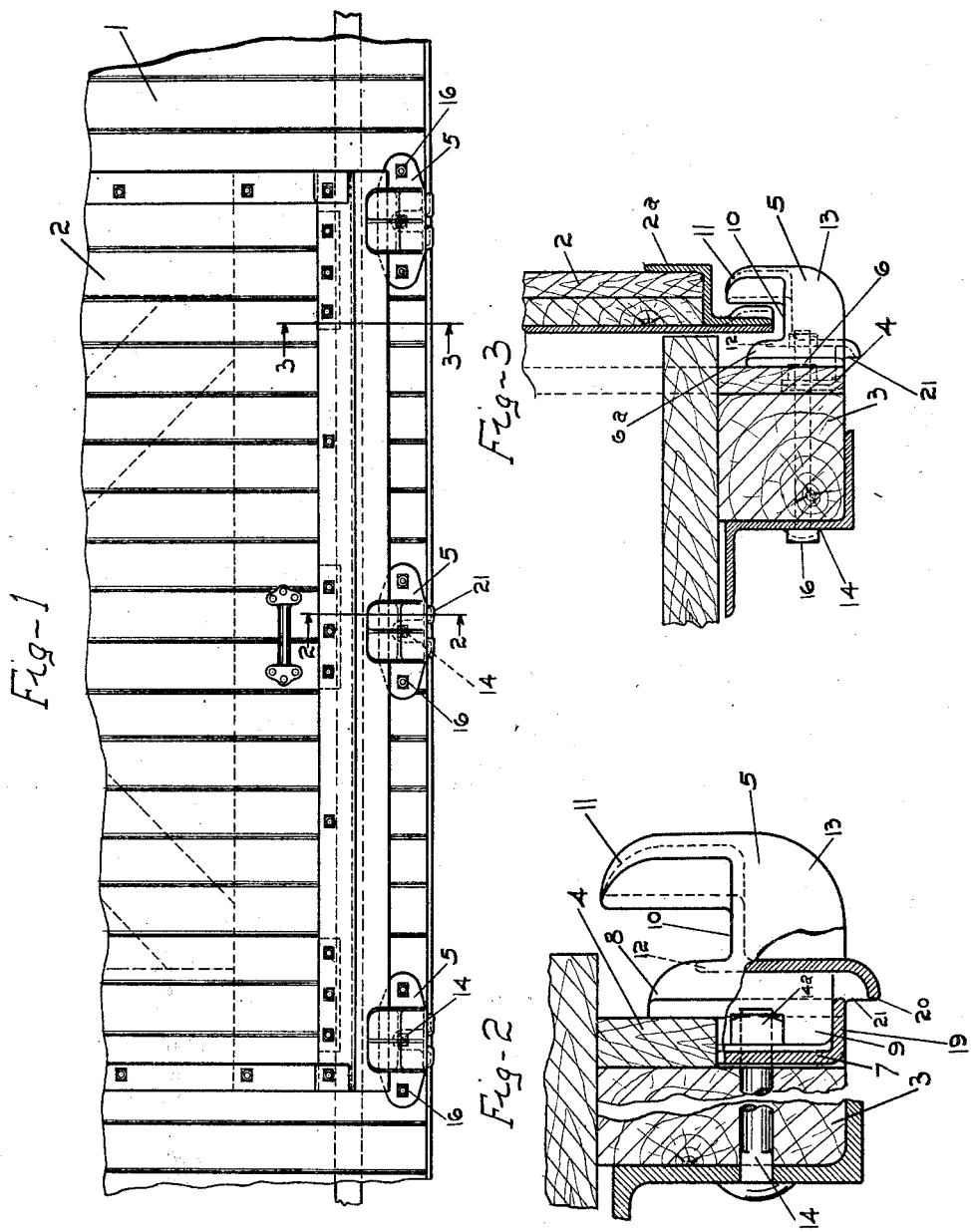

Patented Apr. 9, 1929.

1,708,525

UNITED STATES PATENT OFFICE.

KENNETH J. TOBIN, OF CHICAGO, ILLINOIS, ASSIGNOR TO CAMEL COMPANY, OF CHICAGO, ILLINOIS, A CORPORATION OF ILLINOIS.

CAR-DOOR BRACKET AND GUIDE.

Application filed March 24, 1927. Serial No. 177,854.

This invention relates to car door bracket and guiding means.

More particularly this invention relates to burglar proof means for guiding and securing a margin of the sliding doors of railway freight cars against unauthorized opening.

Under existing practice, car doors are frequently supported upon a pair of space rollers at the top, and brackets or guides are employed for guiding the lower edge of a car door, and which are so secured to the car body as to prevent the door from being swung out and away from the car side while said door is in closed position.

Great ingenuity has been displayed by car thieves in gaining access to railway freight cars. They may, by clever manipulation, remove one or more of the ordinary guides, usually near the rear lower edge of the door, and swing the door out and away from the car side sufficiently to enter and pilfer the contents of a car without breaking the sealing ribbons which are commonly used for sealing freight car doors against opening.

It is an object of this invention to prevent such pilferage of a car by providing a novel and improved bracket of that class which are employed for guiding the lower edge of the car doors and which are so secured to the car body that they cannot be removed while the car door is in closed position, to engage the brackets.

It is a further object of this invention to provide a novel form of bracket having part of its fastening bolts concealed and protected by the bracket, whereby, notwithstanding the removal of the exposed fastened bolts, the bracket cannot be removed or revolved about the axis of its concealed bolt.

It is a further object of this invention to provide a novel form of bracket which is so designed that its concealed fastening means are protected by said bracket so that said means may not be removed by the insertion of any instrument or tools when the door is in place.

A further object is to provide a guide bracket which is sturdy and simple in construction and presents no parts which are liable to become loose or lost from the car, and which shall be secured against unauthorized removal or displacement while the car is in transit.

A further object is to provide a bracket of the type described, which is so constructed as to provide an exit for foreign matter.

With these and other objects in view, which become more apparent in the following description and disclosure, this invention comprises a novel structure and combinations hereinafter described, and more particularly pointed out and defined in the appended claims.

In the accompanying drawings, which illustrate an approved embodiment of this invention, and in which similar reference numerals refer to similar features in the different views:

Figure 1 is a fragmentary broken elevational view of a car door showing this invention applied thereto.

Figure 2 is an enlarged fragmentary view taken on the line 2—2 of Figure 1, with parts removed.

Figure 3 is an enlarged fragmentary view taken on the line 3—3 of Figure 1, showing the door in closed position.

Figure 4 is a top plan view of the guide bracket.

Figure 5 is a front elevational view of said bracket with a portion broken away to illustrate the anchorage for the concealed bolt and the drain apertures.

Figure 6 is a side elevational view of the guide bracket with parts shown in section illustrating the inside concealed anchorage means and the drain apertures.

As shown on the drawings: In referring to the drawings which illustrate one embodiment of this invention, it will be observed that there is shown an ordinary car side 1, having slideably secured thereto the door 2. Referring to Figures 2 and 3, there is indicated a portion of the side sill 3 of the car, and the side sheathing 4, or other structure to which the guide bracket 5 is attached.

The guide bracket if desired, may be of the usual or any approved general pattern so that when in position upon the car, it may not present an unusual appearance. Broadly it consists of an outer guiding portion and an inner offset pocket, the inner wall of which may be attached to the car, the pocket concealing and rendering inaccessible the securing means.

In the specific illustration of this invention, the outer guiding portion of the bracket 5 consists of a guide flange 11 having an inner arcuate surface and reinforced upon its outer surface by ribs 13. At the base 10 of the guide flange 11, there is a guideway formed by the outer arcuate flange 11 and an inner wall 12. The aforementioned offset pocket 9, is formed by an inner wall 7 having terminal walls 8 which merge into the attaching flanges 6, which in turn merge into the forward guiding portion bracket. These attaching flanges 6 project above the wall 12 and curve downwardly as indicated at 6ª to cooperate with the outer arcuate flange 11 for guiding the door and also for preventing access to the pocket 9.

It will be noted that the top of the rear wall 7 of the pocket is some distance below the top of the flanges 6 and the inner wall 12 of the guiding portion. This is for the purpose of accommodating the sheathing and rendering still more inaccessible the securing means extending through the inner wall of the pocket which is shown as provided with an aperture 15 for receiving the securing means such as a carriage bolt 14 or the like, having a nut 14ª within the pocket.

In assembling the bracket upon a car it is attached directly to the sill 3 the width of the offset pocket corresponding to the sheathing board, the particular board above the pocket will stop short at its lower end to rest upon the top wall of the pocket and will further render the pocket inaccessible. The pocket is adapted to be secured by the aforementioned bolt 14, extending through the rear wall of the pocket and bolt 16 extending through the aperture 17 and flanges 6.

The bottom 19 of the pocket 9 is preferably provided with chute like members 18 having inwardly opening exits 21, the bottom of the members 18 having inwardly deflecting lips 20 for this purpose. On account of the size of these exits and the fact that they open inwardly, it is impossible to enter a tool therein for operating on the nut 14ª. These exits allow foreign matter to escape from the pocket.

When the door is in it closed position it will be impossible to have access to the pocket to loosen the guide. If the flanges 6 should be loosened it would be impossible to turn or rotate the bracket on account of the offset portion that is hemmed in by the sheathing boards.

The door is provided with the usual lower Z-bar 2ª that travels in the guideways of the brackets, which are usually positioned above the lower margin of the door, one always being provided at the rear end of the door. According to this invention it is now impossible for a thief to remove the rear bracket and force the door outwardly and away from the car side as has previously been done.

What is claimed is:

1. In a car door guiding and retaining bracket, a casting having an outer guiding portion, an inner guiding portion, a wall inwardly offset from said inner guiding portion and below the top thereof forming an upwardly open pocket and lateral attaching flanges extending intermediate said inner guiding portion and said offset wall.

2. In a car door guiding and retaining bracket, a casting having opposed walls forming a guideway, said casting having lateral attaching flanges and a wall inwardly offset from said attaching flanges and forming an upwardly open pocket behind and below said opposed guiding walls.

3. In combination with the side sheathing of a railway car, a bracket having opposed walls forming a guideway and lateral flanges attached to said sheathing, and having an inwardly offset wall beneath said sheathing and means for fastening said offset wall to the car.

KENNETH J. TOBIN.